(12) United States Patent
Nagasawa

(10) Patent No.: US 7,916,247 B2
(45) Date of Patent: Mar. 29, 2011

(54) ELECTRO-OPTIC DEVICE, AND ELECTRONIC APPARATUS INCLUDING THE SAME

(75) Inventor: Hitoya Nagasawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 126 days.

(21) Appl. No.: 12/200,000

(22) Filed: Aug. 28, 2008

(65) Prior Publication Data
US 2009/0059141 A1    Mar. 5, 2009

(30) Foreign Application Priority Data

Aug. 30, 2007  (JP) .................. 2007-223556
Jul. 28, 2008   (JP) .................. 2008-193181

(51) Int. Cl.
*G02F 1/1333*   (2006.01)
(52) U.S. Cl. ....................................... 349/110
(58) Field of Classification Search .................... 349/110
See application file for complete search history.

(56) References Cited

U.S. PATENT DOCUMENTS 5,768,107 A * 6/1998 Ouchi et al. ................... 361/792
2006/0279687 A1* 12/2006 Park et al. ..................... 349/142

FOREIGN PATENT DOCUMENTS

| JP | 07-092456 | 4/1995 |
| JP | 11-202307 | 7/1999 |
| JP | 2004-347659 | 12/2004 |

* cited by examiner

*Primary Examiner* — David Nelms
*Assistant Examiner* — Phu Vu
(74) *Attorney, Agent, or Firm* — Workman Nydegger

(57) ABSTRACT

An electro-optic device includes: A frame light-shielding film defined a periphery of a pixel area. A frame light-shielding film having an opening at a predetermined position. An alignment mark formed in the opening. An opening light-shielding film formed so as to shield the opening in plan view.

5 Claims, 5 Drawing Sheets

ELECTRO-OPTIC DEVICE, AND ELECTRONIC APPARATUS INCLUDING THE SAME

BACKGROUND

1. Technical Field

The present invention relates to an electro-optic device such as a liquid crystal device and an electronic apparatus such as a liquid crystal projector including the electro-optic device, and more particularly to an alignment mark used to position a substrate of the electro-optic device in manufacture of the electro-optic device.

2. Related Art

In such an electro-optic device, alignment marks for aligning a pair of substrates included in the electro-optic device are formed on each of the substrates. For example, JP-A-7-92456 discloses a laminated optical panel as an example of an electro-optic device in which an alignment mark formed in an aperture pattern having a window frame shape in a light-shielding area of one substrate is provided in the one substrate and an alignment mark formed in a geometric pattern having a center pointing shape is provided in the other substrate.

However, according to the above-described laminated optical panel, the light-shielding film is removed from the alignment marks. Accordingly, when a distance between the an pixel area and the alignment marks becomes small with the miniaturization of the electro-optic device, there occurs a problem in that light may leak from the alignment marks when an image is displayed.

SUMMARY

An advantage of some aspects of the invention is that it provides an electro-optic device suitable for miniaturization while preventing light leakage and an electronic apparatus including the electro-optic device.

According to an aspect of the invention, there is provided an electro-optic device including: a substrate; a frame light-shielding film which is formed in a frame area defining the periphery of a pixel area on the substrate and in which an opening is at a predetermined position; an alignment mark which is formed in the opening; and an opening light-shielding film which is formed so as to shield the opening in plan view from the substrate.

In the electro-optic device having the above-described configuration, the frame light-shielding film is formed in a frame area which defines the periphery of the pixel area on the substrate such as a TFT (Thin Film Transistor) substrate in plan view from the substrate. In this case, "the pixel area" does not mean an individual pixel area, but means an entire area where a plurality of pixels are arranged in a matrix shape and an area generally called "an image display area". The opening is located between the frame light-shielding film and a seal material, or is an opening perforated in or cut out of the frame light-shielding film. The frame light-shielding film is not provided in the opening. Accordingly, light is not shielded by the frame light-shielding film and can pass through the opening. The opening is formed at the predetermined position and may be positioned in each corner of the substrate or in a side of the substrate. Moreover, just one opening may be provided, or a plurality of the openings may be perforated or cut out.

The alignment mark is formed within the opening in plan view from the substrate. The electro-optic device includes, for example, a TFT substrate. For example, the electro-optic device includes a counter substrate, and an alignment mark confronting the alignment mark formed on the TFT substrate is formed on the counter substrate.

The opening light-shielding film is formed in a different layer where the alignment marks are formed so as to shield the opening in plan view from the substrate.

According to the study of the inventors, the alignment mark has to be provided in every counter substrate, when elements such as TFTs are generally formed on a mother substrate such as a large-scale glass substrate and a plurality of counter substrates are attached to the mother board provided with the elements to manufacture the electro-optic device.

When a distance between the pixel area and the alignment marks becomes small with miniaturization of the electro-optic device, there is a possibility that light leaks from the alignment marks. If the alignment is formed in, for example, a seal area to enlarge the distance between the pixel area and the alignment marks, it has been proved that the alignment marks cannot be correctly recognized due to an influence of a seal member.

However, in the electro-optic device having the above-described configuration, the opening light-shielding film is provided separately with the frame light-shielding film (that is, in a layer different from a layer provided with the frame light-shielding film) to shield the opening provided with the alignment marks. Accordingly, even though the distance between the pixel area and the alignment marks becomes small, the light leakage from the alignment mark can be prevented by the opening light-shielding film. Meanwhile, when a reflection ratio of the opening light-shielding film is made smaller than that of the alignment marks, the alignment marks can be viewed using a contrast difference, thereby taking alignment.

When the opening light-shielding film is formed in one same layer of the layers where wirings, electric elements, and the like constituting a driving circuit which drives the electro-optic device are arranged, an increase in the height of the electro-optic device can be prevented by forming the opening light-shielding film. Accordingly, it is possible to avoid complexity of a laminated structure on the substrate and a manufacturing process.

According to the electro-optic device having the above-described configuration, the opening light-shielding film may be formed of a material having a reflection ratio lower than that of a material which constitutes the alignment mark.

In the electro-optic device, the alignment mark can be viewed using a contrast difference generated due to a difference in the reflection ratio. Moreover, the opening light-shielding film may be made of a material having a light-absorbing ratio higher than that of a material constituting the alignment mark.

The electro-optic device having the above-described configuration may further include: data lines and scanning lines which intersect each other in the pixel area. The opening light-shielding film may be formed in the same layer in which the data lines or the scanning lines are formed.

In the electro-optic device, the increase in the height of the electro-optic device can be prevented by forming the opening light-shielding film, thereby having an advantage in a practical use. Moreover, in the manufacture of the electro-optic device, an increase in the number of processes for forming the opening light-shielding film can be prevented since the opening light-shielding film can be formed simultaneously with the data lines and the scanning lines. Accordingly, an advantage can be obtained in a practical use.

According to the electro-optic device having the above-described configuration, the opening may be formed in the corner of the substrate as the predetermined position.

In the electro-optic device, the alignment mark perforated in the corner of the substrate in plan view from the substrate is formed. The openings are generally located at four corners of the substrate or two diagonal corners.

According to the electro-optic device having the above-described configuration, the alignment mark may be formed above the opening light-shielding film on the substrate.

In the electro-optic device, the alignment marks is formed above the light-shielding film. In other words, a layer where the opening light-shielding film is disposed between layers where the substrate and the alignment mark are each formed.

According to another aspect of the invention, there is provided an electronic apparatus including the electro-optic device having the above-described configuration.

Since the electronic apparatus includes the electro-optic device having the above-described configuration, it is possible to realize various electronic apparatuses such as a projection type display apparatus, a cellular phone, an electronic pocket book, a word processor, a view finder type or monitor direct vision-type video tape recorder, a workstation, a television phone, a POS terminal, and a touch panel suitable for miniaturization, while preventing light leakage from the alignment mark.

An operation and other advantages are apparent from an exemplary embodiment described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

An electro-optic device and an electronic apparatus including the electro-optic device according to an exemplary embodiment of the invention will be described with reference to FIGS. 1 to 7. In addition, in the figures described below, layers and elements are expressed in different scales so as to allow the layers and the elements to be visible in the figures. In the embodiment, a TFT active matrix driving-type liquid crystal device having a driving circuit therein will be described as an example of an electro-optic device.

Figure 1:
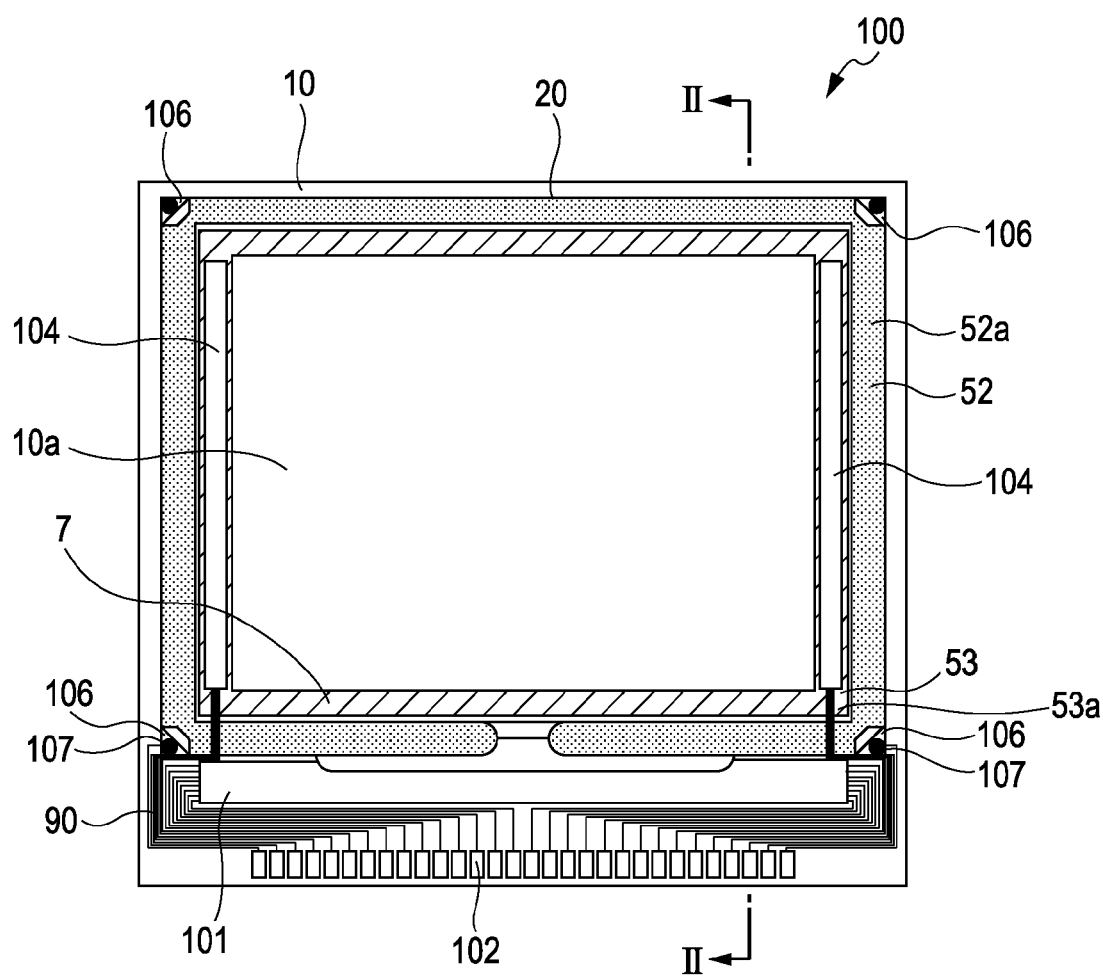
FIG. 1 is a plan view illustrating the entire configuration of a liquid crystal device according to an embodiment of the invention.
Figure 2:
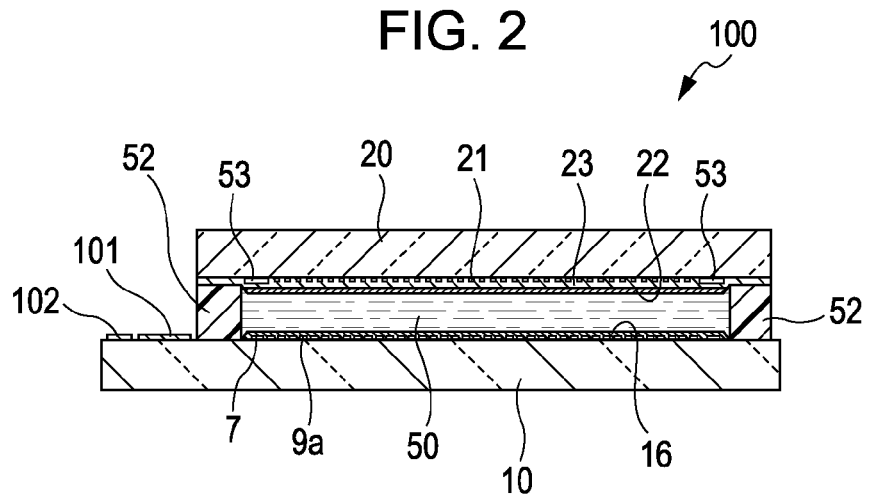
FIG. 2 is a sectional view taken along the line II-II of FIG. 1.

First, according to this embodiment, an overall configuration of the liquid crystal device will be described with reference to FIGS. 1 and 2. FIG. 1 is a plan view illustrating constituent elements formed on a TFT array substrate of the liquid crystal device when viewed from a counter substrate. FIG. 2 is a sectional view taken along the line II-II of FIG. 1.

In FIGS. 1 and 2, in the liquid crystal device according to the embodiment, a TFT array substrate 10 and a counter substrate 20 are disposed so as to face with each other. The TFT array substrate 10 is a transparent substrate such as a quartz substrate, a glass substrate, or a silicon substrate. The counter substrate 20 is a transparent substrate such as a quartz substrate or a glass substrate. A liquid crystal layer 50 is interposed between the TFT array substrate 10 and the counter substrate 20. The TFT array substrate 10 and the counter substrate 20 are adhered to each other by a seal member 52 which is provided in a seal area 52a located in the periphery of an image display area 10a as an example of "a pixel area" according the invention.

In order to adhere both the substrates one another, the seal member 52 made of an ultraviolet curable resin, a thermoset resin, a ultraviolet and thermoset curable resin, or the like is applied on the TFT array substrate 10 and cured by ultraviolet irradiating, heating, or the like in a manufacturing process. In the seal member 52, there are sprayed gap members such as glass fibers or glass beads for spacing a predetermined gap (that is, a gap) between the TFT array substrate 10 and the counter substrate 20. Alternatively, the gap members may be disposed in an image display area 10a or the peripheral area around the image display area 10a along with mixture with the seal member 52 or instead of the seal member 52.

In FIG. 1, a frame light-shielding film 53 which is disposed in parallel inside the seal area 52a where the seal member 52 is provided and defines the image display area 10a is provided in the counter substrate 20. In this case, a part or the whole of the frame light-shielding film 53 may be as a light-shielding film included in the TFT array substrate 10. A frame area 53a where the frame light-shielding film 53 is formed has a rectangular frame shape in plan view from the TFT array substrate 10.

In a peripheral area outside the seal area 52a where the seal member 52 is provided, a data line driving circuit 101 and external circuit connecting terminals 102 are provided along one side of the TFT array substrate 10. A sampling circuit 7 is provided at an inner position than the seal area 52a and along the one side so as to be covered with the frame light-shielding film 53. Scanning line driving circuits 104 are provided in the frame area 53a inside a seal area 52a and along two sides adjacent to the one side so as to be covered with the frame light-shielding film 53. In addition, alignment marks described below are each disposed in four corners of the display, that is, at positions between corners of the frame light-shielding film 53 and the seal member 52.

On the TFT array substrate 10, vertical conductive terminals 106 for allowing vertical conductive members 107 to connect both the substrates one another are disposed in areas facing four corners of the counter substrate 20. With such a configuration, the TFT array substrate 10 and the counter substrate 20 can be electrically connected to each other. In addition, there are formed drawn wiring lines 90 for electrically the external circuit connection terminals 102, the data line driving circuit 101, the scanning line driving circuits 104, the vertical conductive members 106, and the like.

In FIG. 2, on the TFT array substrate 10, there is formed a laminated structure in which pixel switching TFTs as driving elements or wirings such as, scanning lines, and data lines are formed. The detail configuration of the laminated structure is illustrated in FIG. 2. Pixel electrodes 9a made of a transparent material such as ITO (Indium Tin Oxide) are each formed in each of pixels on the laminated structure so as to have an island shape a predetermined pattern.

The pixel electrodes 9a are formed in the image display area 10a on the TFT array substrate 10 so as to face counter electrodes 21 described below. An alignment film 16 is formed on a surface facing the liquid crystal layer 50 in the TFT array substrate 10, that is, the pixel electrodes 9a so as to shield the pixel electrodes 9a.

A light-shielding film 23 is formed on a counter surface facing the TFT array substrate 10 in the counter substrate 20. The light-shielding film 23 is formed in a lattice shape in plan view on the counter surface in the counter substrate 20, for example. On the counter substrate 20, a non-opening area is defined by the light-shielding film 23, and an area marked by the light-shielding film 23 is an opening area where light emitted from a lamp or a direct view-type backlight of a projector, for example, is penetrated. Alternatively, the light-shielding film 23 is formed in a stripe shape, and the non-opening area may be defined by the light-shielding film 23 and various constituent elements such as data lines provided in the TFT array substrate 10.

Counter electrodes 21 made of a transparent material such as ITO are formed on the light-shielding film 23 so as to face a plurality of the pixel electrodes 9a. On the light-shielding film 23, a color filter may be formed in an area including the opening area and a part of the non-opening area, though the color filter is not shown in FIG. 2, in order to perform a color display operation in the image display area 10a. On the counter surface of the counter substrate 20, an alignment film 22 is formed on the counter electrodes 21.

On the TFT array substrate 10 shown in FIGS. 1 and 2, a pre-charge circuit for supplying a pre-charge signal having a predetermined voltage level to the plurality of data lines prior to the image signal and an inspection circuit for inspecting a quality, detect, or the like of the liquid crystal device during manufacture or in shipment may be formed in addition to the data line driving circuit 101, the scanning line driving circuit 104, and the sampling circuit 7.

Figure 3:
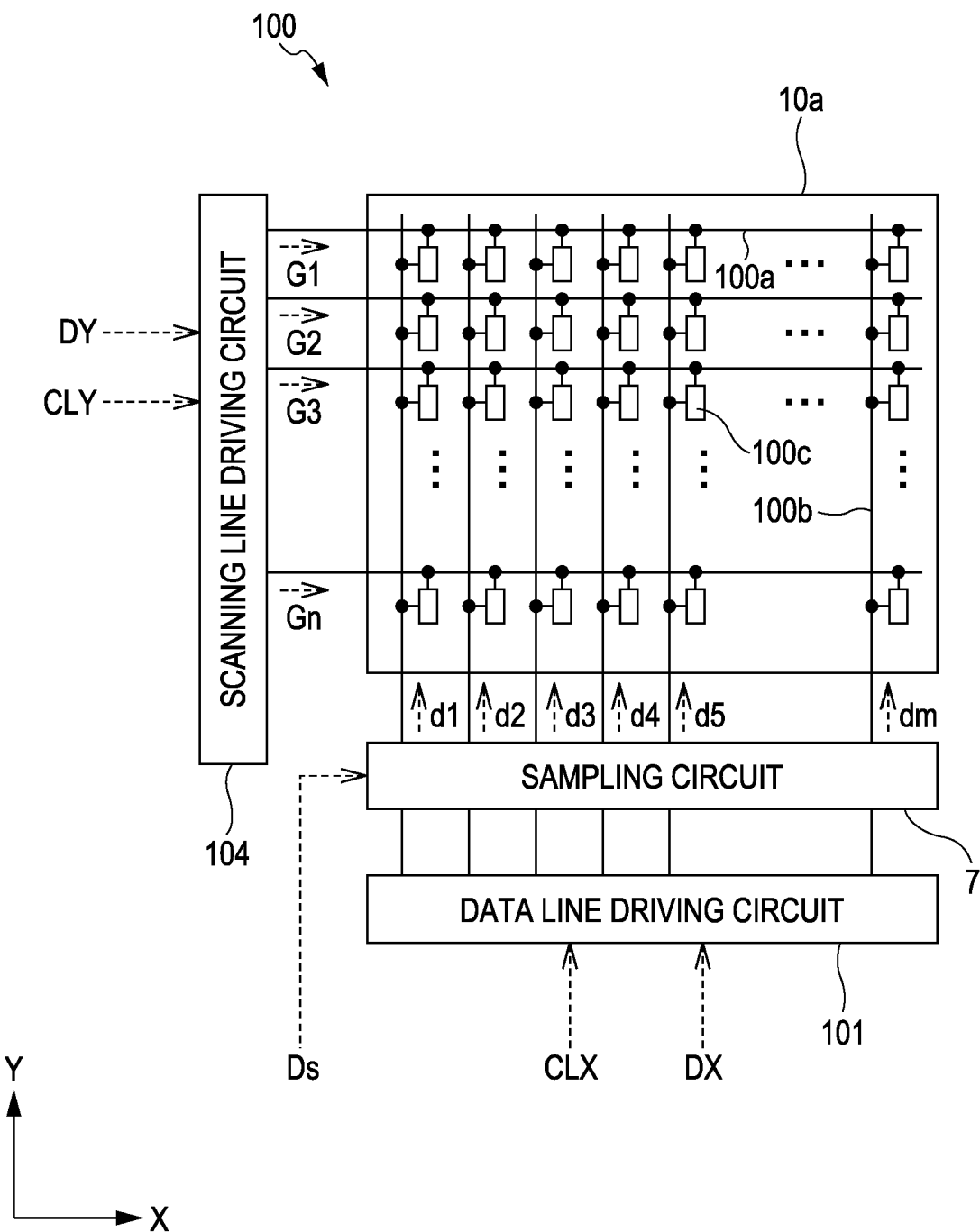
FIG. 3 is a schematic diagram illustrating the configuration of major elements of the liquid crystal device according to the embodiment of the invention.

Next, configurations of the data line driving circuit 101 and the scanning line driving circuit 104 which drive a liquid crystal panel 100 will be described in detail with reference to FIG. 3. FIG. 3 is a schematic diagram illustrating a configuration of major element of the liquid crystal device according to this embodiment.

As shown in FIG. 3, a plurality of pixels 100c arranged in a matrix shape and the plurality of scanning lines 100a and the plurality of data lines 100b arranged to intersect each other are formed in the image display area 10a of the TFT array substrate 10. Even though not shown, each of the plurality of pixels 100c includes the pixel electrode 9a, the TFT for switching the pixel electrode 9a, a storage capacitor for maintaining voltage applied to the pixel electrode 9a.

The data line driving circuit 101 supplies a start pulse DX and a data transmission clock CLX to be input and a sampling circuit driving signal to a sampling circuit 7. The sampling circuit 7 samples a data signal Ds to be input, in response to the sampling circuit driving signal. In this way, data signals di (I=1, 2, 3, . . . m) are supplied to the data lines 100b of the liquid crystal panel 100. The scanning line driving circuit 104 sequentially outputs scanning signals Gj (j=1, 2, 3, . . . n) from ends of the scanning lines on the basis of a start pulse DY and a scanning transmission clock CLY to be input.

The scanning line driving circuit 104 and the data line driving circuit 101 perform inputting and outputting various signals, but description of signals which are not particularly related to this embodiment will be omitted.

Figure 4:
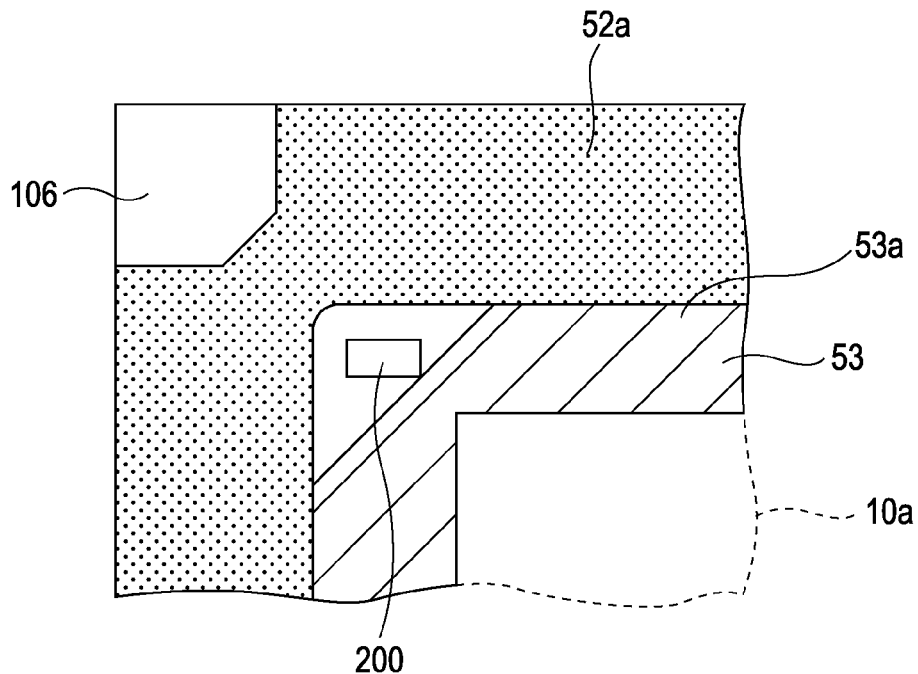
FIG. 4 is an explanatory diagram illustrating the position of an alignment mark according to the embodiment of the invention.
Figure 5:
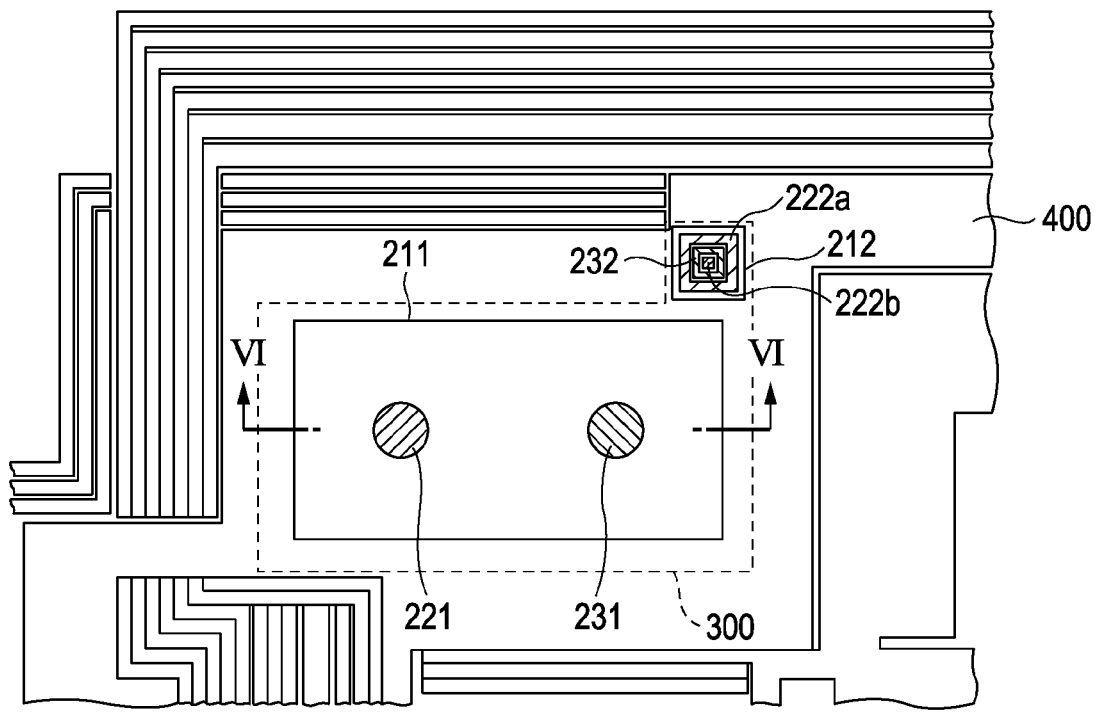
FIG. 5 is a plan view illustrating the configuration of the alignment mark according to the embodiment of the invention.
Figure 6:
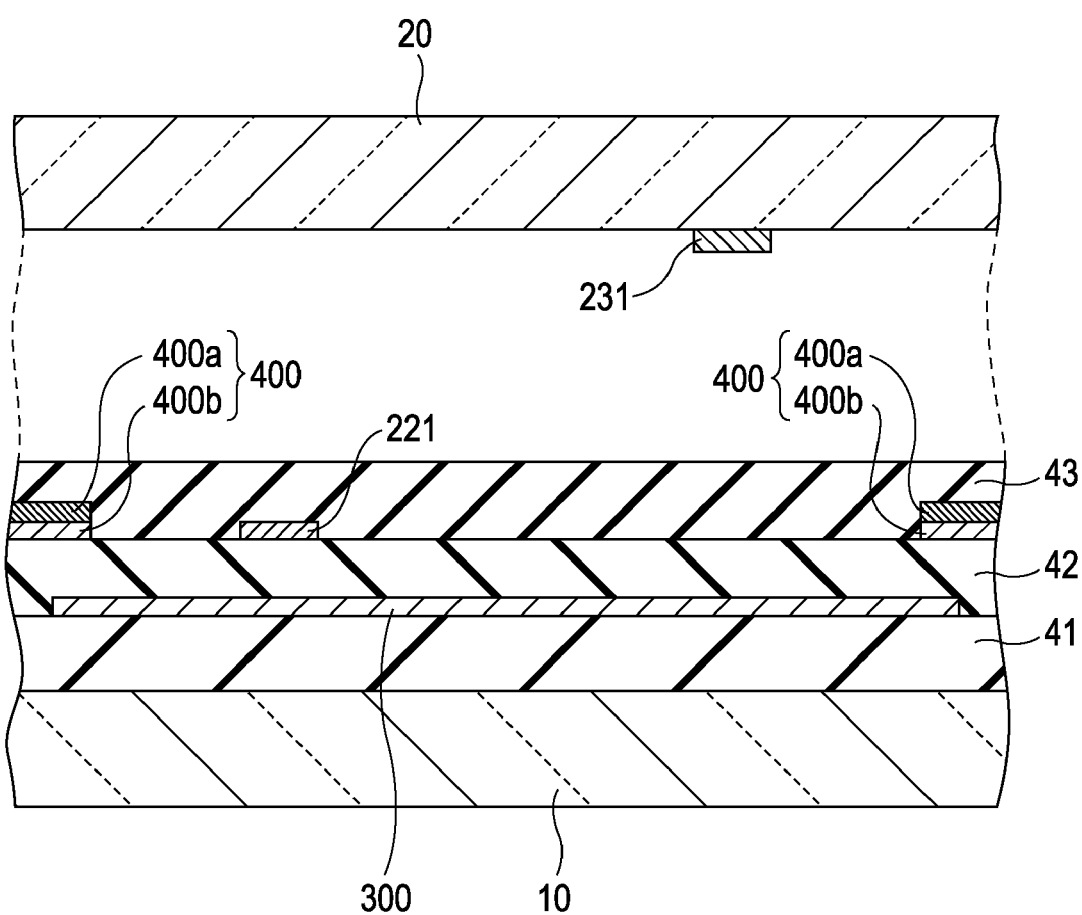
FIG. 6 is a sectional view taken along the line VI-VI of FIG. 5.

Next, the alignment marks of the liquid crystal device according to this embodiment will be described with reference to FIGS. 4 to 6. FIG. 4 is an explanatory diagram illustrating the position of the alignment marks in the liquid crystal device. FIG. 5 is a plan view illustrating the configuration of the alignment marks when viewed from a side of the counter substrate 20. FIG. 6 is a sectional view taken along the line VI-VI of FIG. 5. In FIGS. 4 to 6, only constituent elements related to the alignment marks are shown and other constituent elements are not shown for convenient explanation.

First, as shown in FIG. 4, an alignment mark 200 is formed in each corner of the frame area 53a and at a position where the frame light-shielding film 53 is not provided. In FIG. 4, the alignment mark 200 is shown in the left upper corner in FIG. 1. In this embodiment, the same alignment marks 200 are formed in three other corners in the liquid crystal device.

Next, the configuration of the alignment mark 200 will be described in detail with reference to FIGS. 5 and 6. As shown in FIG. 5, the alignment mark 200 includes first alignment marks 221 and 231 which are provided within an opening 211 formed in a wiring 400. The alignment marks 221, 231 are for measuring X-Y shift and θ shift. Second alignment marks 222a, 222b, 232 are provided in an opening 212 in the wiring 400 to measure combination shift.

As shown in FIG. 6, the first alignment mark 221 is formed on the TFT array substrate 10 and the first alignment mark 231 is formed on the counter substrate 20. The second alignment marks 222a and 222b are formed in the same layer in which the first alignment mark 221 is formed on the TFT array substrate 10. The second alignment mark 232 is formed in the same layer in which the first alignment mark 231 is formed on the counter substrate 20.

The first alignment mark 221 and the second alignment marks 222a and 222b are made of a material containing aluminum. The first alignment mark 231 and the second alignment mark 232 are made of a material containing an alloy of aluminum and chromium or chromium.

As shown in FIG. 5, a mark light-shielding film 300 is formed as an example of "an opening light-shielding film" that completely overlaps the openings 211 and 212 in plan view so that no gaps are formed between the outer edges of the mark light-shielding film 300 and the edges of wiring 400 that define the openings 211 and 212. On the TFT array substrate 10, as shown in FIG. 6, the mark light-shielding film 300 is formed below the layer in which the first alignment mark 221 is formed, that is, on a side of the TFT array substrate 10. Even though not shown, the scanning lines 100a and the data lines 100b are formed in the same layer in which the mark light-shielding film 300 is formed.

The mark light-shielding film 300 has a three-layer structure in which a layer formed of aluminum, a layer formed of titanium nitride, and a layer formed of a plasma nitride film are formed sequentially from the lower layer, for example.

Portions other than the alignment mark are shielded from light by arranging a plurality of wirings including a wiring 400 around the openings 211 and 212. That is, it is possible to obtain an advantage of a case where the frame light-shielding film 53 is provided on the entire frame area 53a by arranging the plurality of wirings. In addition, the wirings are not provided in the portion where the alignment mark is formed so that the openings 211 and 212 are perforated or cut out.

The wiring 400 has a two-layer structure in which a layer 400b made of a material containing aluminum is formed below a layer 400a made of a material containing titanium nitride. Even though not shown, a wiring is formed in another layer so as to shield a gap between the wirings in FIG. 5 in plan view. Moreover, the wiring 400 and the like shown in FIG. 5 are signal wirings or power wirings of the inspection circuit and the like. However, signal wirings or power wirings of the data line driving circuit 101, the scanning line driving circuit 104, the sampling circuit 7, and the like are arranged around the alignment mark in some positions where the alignment mark is formed.

As shown in FIG. 6, the first alignment mark 221 is different from the wiring 400 formed in the same layer in which the first alignment mark 221 is formed in that the first alignment mark 221 does not include a layer made of a material containing titanium nitride. The reason for constituting no titanium nitride is to improve a reflection ratio of the first alignment mark 221 by forming the first alignment mark 221 with only the layer made of a material containing aluminum.

In order to prevent short-circuit between the elements, an interlayer insulating film 41 is formed between the TFT array substrate 10 and the mark light-shielding film 300, an interlayer insulating film 42 is formed between the layer where the mark light-shielding film 300 and the layer where the first alignment mark 221 and the like are formed, an interlayer insulating film 43 is formed above the layer where the first alignment mark 221 and the like are formed. Contact holes or the like for electrically connecting wirings and the like included in each layer are formed in the various insulating films 41, 42, and 43.

As described above, the first alignment mark 221 and the second alignment marks 222a and 222b are made of a material containing aluminum having a relatively high reflection ratio. In addition, the first alignment mark 231 and the second alignment mark 232 are made of a material containing an alloy of aluminum and chromium or chromium having a relatively high reflection ratio. Meanwhile, the mark light-shielding film 300 is formed on the uppermost layer formed of, for example, a plasma nitride film having a relatively low reflection ratio. Accordingly, when the alignment is taken, a contrast difference is made depending on a difference in the reflection ratio upon viewing the alignment marks from the above of the counter substrate 20, thereby recognizing the alignment marks. Moreover, when the liquid crystal device is driven, it is possible to prevent light leakage from the alignment marks by the mark light-shielding film 300.

Electronic Apparatus

Figure 7:
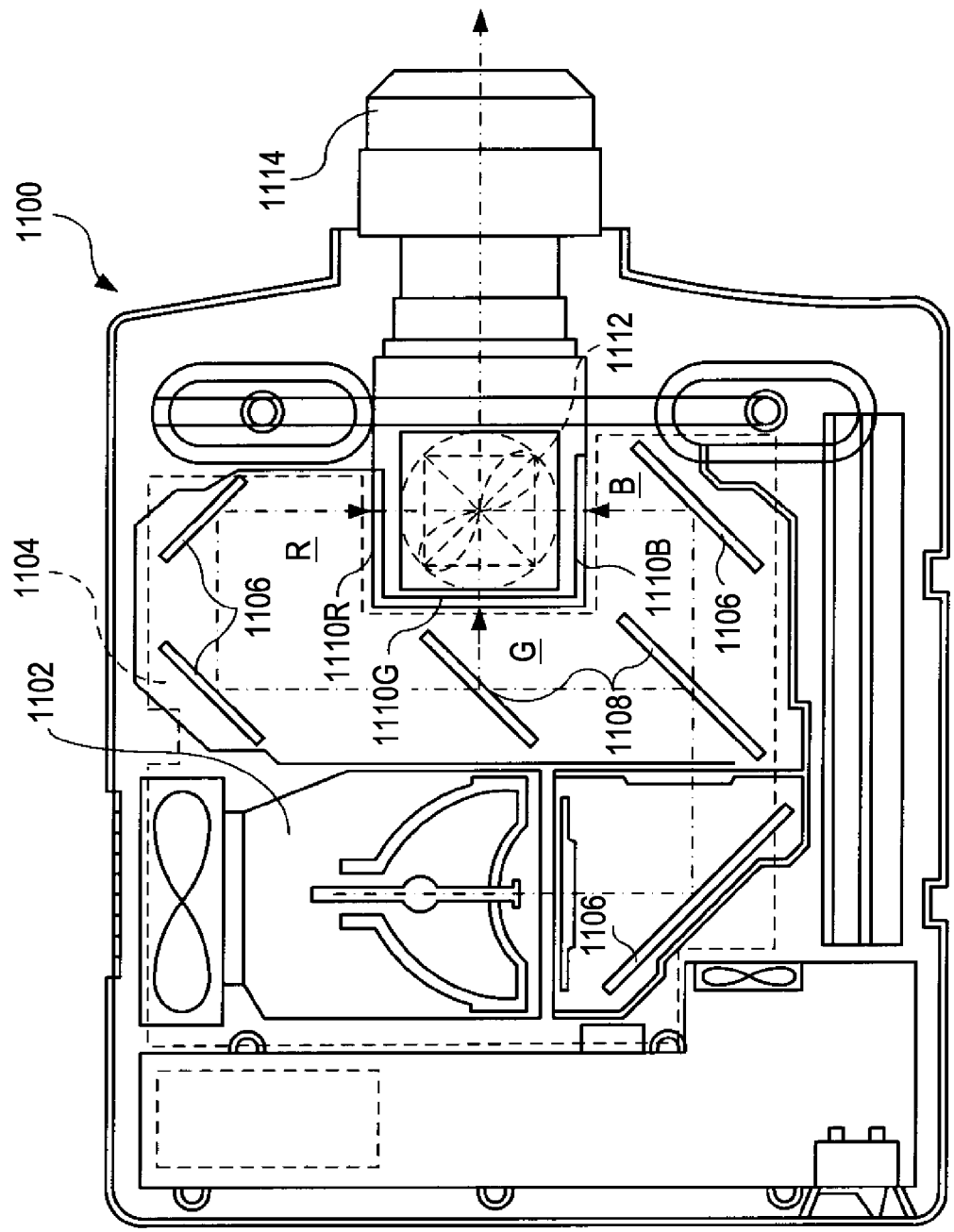
FIG. 7 is a plan view illustrating the configuration of a projector which is an example of an electronic apparatus to which an electro-optic device is applied.

Next, a case where the above-described liquid crystal device as an electro-optic device is applied to a projector as an example of an electronic apparatus will be described with reference to FIG. 7. The liquid crystal panel 100 of the above-described liquid crystal device is used as a light valve of the projector. FIG. 7 is a plan view illustrating a configuration example of the projector.

As shown in FIG. 7, a lamp unit 1102 of a white light source, such as a halogen lamp, is provided inside a projector 1100. Projection light emitted from the lamp unit 1102 divided into the three primary color beams of R, G, and B by four mirrors 1106 and two dichroic mirrors 1108 disposed inside a light guide 1104, and the three primary color beams are incident on liquid crystal panels 1110R, 1110B, and 1110G as light valves corresponding to the three primary colors, respectively.

A configuration of the liquid crystal panels 1110R, 1110B, and 1110G is the same as that of the above-described liquid crystal device. The liquid crystal panels 1110R, 1110B, and 1110G are driven in accordance with primary color signals of R, G, and B supplied from image signal processing circuits, respectively. Light modulated by the liquid crystal panels is incident on a dichroic prism 1112 from three directions. In the dichroic prism 1112, the color beams of R and B are refracted at 90° and the color beam of G goes straight. Accordingly, images of the respective colors are synthesized to be projected onto a screen or the like through a projection lens 1114.

As for images displayed by the liquid crystal panels 1110R, 1110B, and 1110G, it is necessary to reverse the images displayed by the liquid crystal panels 1110R and 1110B in a symmetrical mirror shape respective to the image displayed by the liquid crystal panel 110G.

Since respective light corresponding to the three primary colors of R, G, and B is incident onto the liquid crystal panels 1110R, 1110B, and 1110G by the dichroic mirrors 1108, it is not necessary to provide a color filter.

In addition to the electronic apparatus described with reference to FIG. 7, examples of the electronic apparatus include a mobile type personal computer, a cellular phone, a liquid crystal TV, a view finder type or monitor direct view-type video tape recorder, a car navigation apparatus, a pager, an electronic pocket book, a calculator, a word processor, a work station, a television phone, a POS terminal, an apparatus having a touch panel, and the like. In addition, the liquid crystal device can also be applied to such various electronic apparatuses.

In addition to the liquid crystal device described in the above-described embodiment, certain embodiments can apply to a reflective liquid crystal display device (LCOS) a plasma display panel (PDP), a field emission display (FED and SED), an organic EL display, a digital micro-mirror device (DMD), an electrophoresis apparatus, and the like in which elements are formed on a silicon substrate.

The invention is not limited to the above-described embodiment, but may be appropriately modified in various forms without departing from the gist and spirit of the invention which can be understood from the appended claims and the whole specification. Therefore, it can be understood that an electro-optical device including such modifications and an electronic apparatus employing the electro-optical device are included in the technique scope of the invention.

What is claimed is:

1. An electro-optic device comprising:
   a substrate;
   a pixel area on the substrate;
   a frame light-shielding film that defines the periphery of the pixel area, the frame light-shielding film having an opening outside of the pixel area, the frame light-shielding film including:
      a first frame-light shielding film layer; and
      a second frame-light shielding film layer formed on the first layer, the second frame-light shielding film layer being formed of a material having a reflection ratio lower than that of a material which constitutes the first frame-light shielding film layer;
   an alignment mark located in the opening of the frame light-shielding film, the alignment mark being formed in a layer together with the first frame-light shielding film layer without being formed in a layer where the second frame-light shielding film layer is formed; and
   an opening light-shielding film disposed between the alignment mark and the substrate, the opening light-shielding film being formed of a material having a reflection ratio lower than that of a material which constitutes the alignment mark.

2. The electro-optic device according to claim 1, further comprising:
   data lines and scanning lines which intersect each other in the pixel area,
   wherein the opening light-shielding film is formed in the same layer in which the data lines or the scanning lines are formed.

3. The electro-optic device according to claim 1, wherein the opening is located at the corner of the substrate.

4. The electro-optic device according to claim 1, wherein the alignment mark is formed above the opening light-shielding film.

5. An electronic apparatus including the electro-optic device according to claim 1.

* * * * *